United States Patent
Kang

(10) Patent No.: US 6,549,580 B1
(45) Date of Patent: Apr. 15, 2003

(54) SUBSET AVERAGED MEDIAN PREDICTOR FOR DIFFERENTIAL PULSE CODE MODULATION

(75) Inventor: Dong-hee Kang, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/255,632

(22) Filed: Feb. 22, 1999

(30) Foreign Application Priority Data

Feb. 20, 1998 (KR) .............................. 98-5263

(51) Int. Cl.[7] .............................. H04B 14/06
(52) U.S. Cl. ...................... 375/244; 375/243
(58) Field of Search ................ 375/240.12, 240.16, 375/241, 242, 243, 244, 245, 254; 348/415.1, 416.1; 382/238

(56) References Cited

U.S. PATENT DOCUMENTS

| | | | |
|---|---|---|---|
| 4,430,670 A | | 2/1984 | Netravali ............... 375/240.12 |
| 4,498,102 A | * | 2/1985 | Richard et al. .......... 348/415.1 |
| 5,287,200 A | * | 2/1994 | Sullivan et al. ............ 358/433 |
| 5,313,549 A | * | 5/1994 | Ovaska ....................... 388/814 |
| 5,379,355 A | | 1/1995 | Allen .......................... 382/238 |
| 5,696,791 A | | 12/1997 | Yeung ........................ 375/244 |
| 5,905,535 A | * | 5/1999 | Kerdranvat .............. 348/416.1 |
| 6,148,027 A | * | 11/2000 | Song et al. .................. 375/240 |

OTHER PUBLICATIONS

Martucci, S., "Reversible Compression of HDTV Images Using Median Adaptive Prediction and Arithmetic Coding", 1190 IEEE Internation Symposium on Circuits and Syetms, vol. 2/4, May 1–3, 1990, pp. 1311–1313.*

Wichman R. et al., "FIR–Median Hybrid Filters with Excellent Transient Response in Noisy Conditions", IEEE Transactions on Acoustic, Speech, and Signal Processing, vol. 38, No. 12, Dec. 1990, pp. 2108–2117.*

* cited by examiner

*Primary Examiner*—Stephen Chin
*Assistant Examiner*—Chieh M. Fan
(74) *Attorney, Agent, or Firm*—Dilworth & Barrese, LLP

(57) ABSTRACT

A predictor for differential pulse code modulation that designates a subset averaged median (SAM) predictor, which removes transmission errors and/or minimizes error propagation. The SAM predictor in a preferred embodiment operates according to $$SAM(X) = \sum_{i=1}^{P} a_i F_i(X)$$

where X is an input vector within a predictor window, P is the number of median subfilters, $a_i$ is an optionally selected coefficient and $F_i(\ )$ is a feature equation of an $i^{th}$ median subfilter. The coefficients $a_i$ may be selected so as to minimize a prediction error variance and to exclude first order subfilters, where $$\sum_{i=l}^{P} |a_i| < 1,$$

thereby removing transmission error and minimizing prediction error variance through minimization of error propagation.

11 Claims, 4 Drawing Sheets

SUBSET AVERAGED MEDIAN PREDICTOR FOR DIFFERENTIAL PULSE CODE MODULATION

BACKGROUND

1. Field of the Invention

The present invention relates to generally to encoding and decoding of digital data using differential pulse code modulation (DPCM) techniques. More particularly, the invention relates to a subset averaged median (SAM) predictor for a DPCM system, which isolates errors and minimizes error propagation when coding information such as image and voice data.

2. Description of the Related Art

FIG. 1 is a block diagram illustrating a prior art differential pulse code modulation (DPCM) system. The DPCM system includes an encoder 10 having a quantizer 11 and a linear or median-type predictor 12, as well as a decoder 20 with a linear or median-type predictor 12. X(n) is an original input signal, and E(n) is an actual error signal. On the encoding side, predictor 12 predicts the next signal sample to generate a predicted output X'(n) based on the values of immediately preceding signal samples. A subtractor 15 subtracts X'(n) from X(n) to generate an error signal which is quantized by quantizer 11 to generate the error signal E(n). X'(n) is also fed back and summed with the error signal by summer 17 to provide the next sample to predictor 12. The error signal E(n) is transmitted in a transmission channel and is received by decoder 20 as prediction error signal $E_r(n)$. This signal is added to a predicted signal $X_r'(n)$ by adder 19 to generate a reconstructed signal $X_r(n)$ based on $E_r(n)$.

Equations governing the respective operation of linear and median-type predictors are as follows:

Linear predictor: $LIN(X) = 0.5X_1 + 0.25(X_2 + X_3)$ (1)

First median-type predictor: $MED1(X) = med(X_1, X_2, X_3, X_4)$ (2)

Second median-type predictor: $MED2(X) = med(X_1, X_3, X_4)$ (3)

Finite impulse response hybrid median-type predictor (FMH):

$FMH(X) = med(X_1, X_2, X_4, l, r)$ (4)

where $l = X_1 + X_3 - X_2$, and $r = med(X_1, X_2, X_3, X_4)$.

Input values used for prediction associated with a DPCM system are mapped as follows:

$\{X_1, X_2, X_3, X_4\} = \{X(m, n-1), X(m-1, n-1), X(m-1, n), X(m-1, n+1)\}$ (5)

FIG. 2 shows coordinates of a two dimensional mapping input. Most predictors used for prediction of the X (m, n) value use only data which have a strong correlation with X(m, n) because the further the data are from X(m, n), the less contribution the data will have for compression of the signal.

The DPCM system of FIG. 1 traditionally employed a linear predictor for coding data such as image and voice data. Recently, a median-type predictor having a non-linear feature has been used in the DPCM system as an alternative.

Other examples of DPCM systems can be found in U.S. Pat. Nos. 4,430,670; 5,379,355 and 5,696,791.

Techniques to minimize prediction error variance are related to techniques for maintaining signal quality when reconstructing a compressed signal. A DPCM system employing a non-linear median-type predictor can prevent propagation of a reconstructed signal having a transmission error at a receiver, so that the transmission error can be isolated (i.e., removed).

When the receiver of the encoded data reconstructs the original signal by using the same predictor as used on the transmitting side, if a transmission error is generated, the $E_r(n)$ value is not identical to the E(n) value, whereby the original signal can not be accurately reconstructed. Since the DPCM system is a recursive system, when $E_r(n)$ differs from E(n) a reconstruction error of the $n^{th}$ sample affects the next sample to be reconstructed. If the reconstruction error affects the next signal to be reconstructed in such a manner, the error is essentially propagated. This phenomenon is called an error propagation effect.

Some systems adopt a type of predictor which maintains stability or periodically resets transmit/receive signals in order to diminish the propagation effect generated by transmission noise on a reconstructed signal. A DPCM system adapting a linear predictor, however, can not isolate transmission noise generated by a transmission error in a transmission line; thus, it simply strives to improve image or voice quality by minimizing prediction error variance.

If a linear filter (predictor) is employed, then theoretically a technique for checking and verifying the linear filter stability can be implemented. An advantage of such a technique is that the design of filter is simple. The filter is stable if a pole of a transfer function is in a unit circle; however, a shortcoming of this approach is that transmission noise can not be isolated.

Techniques for minimizing prediction error variance and decaying error propagation generated by transmission noise have been proposed. Some of these techniques allow transmission noise to be propagated only up until a certain transmission line section, stopping propagation of the noise after the section. These techniques exhibit shortcomings in that error propagation becomes severe without precise synchronization between a transmitter and a receiver.

A DPCM system employing a median-type predictor is designed to isolate transmission noise or to minimize a prediction error variance regardless of the input signal features. However, such an approach can not perfectly isolate the transmission noise, and the non-isolated transmission noise causes error propagation in a reconstructed signal at the receiver or causes interference in the reconstruction of an original signal. Also, since input signal features are not generally maintained the same, the median-type predictor lacks stability in that the predictor performance may change depending upon the input signals.

Consequently, a DPCM system incorporating a linear predictor can not isolate transmission noise due to a transmission error generated in a transmission line. A DPCM system incorporating a prior art median-type predictor that can isolate transmission noise can not be designed to minimize a prediction error variance in accordance with input signal features. Further, when the transmission noise is not isolated, the error may be propagated to a reconstructed signal at a receiver and interfere in reconstruction of an original signal.

SUMMARY OF THE INVENTION

The present invention is designed to overcome the foregoing problems of prior art DPCM systems.

It is an object of the present invention to provide a new type of predictor for differential pulse code modulation, designated herein as a subset averaged median (SAM) predictor, which can minimize prediction error variance in accordance with input signal features and at the same time either isolate transmission noise or induce a condition where error propagation is decayed.

In one aspect of the present invention, there is provided a SAM predictor for a DPCM system, which removes transmission errors and/or minimizes error propagation. The SAM predictor in a preferred embodiment operates according to $$SAM(X) = \sum_{i=1}^{P} a_i F_i(X),$$

where X is an input vector within a predictor window, P is the number of median subfilters, $a_i$ is an optionally selected coefficient and $F_i(\ )$ is a feature equation of an $i^{th}$ median subfilter. The coefficients as may be selected so as to minimize a prediction error variance and to exclude first order subfilters, where $$\sum_{i=1}^{P} |a_i| < 1,$$

thereby removing transmission error and minimizing prediction error variance through minimization of error propagation.

Other objects and advantages of the present invention will become apparent with reference to the following detailed description and the attached drawings.

BRIEF DESCRIPTION OF THE DRAWINGS

The above and other objects, features and advantages of the present invention will become more apparent from the following detailed description when taken in conjunction with the accompanying drawings in which like reference numeral indicate like elements or features, wherein.

DETAILED DESCRIPTION OF THE PREFERRED EMBODIMENTS

A preferred embodiment of the present invention to be described hereafter relates to subset averaged median (SAM) predictor for a differential pulse code modulator. The modulator not only minimizes or reduces prediction error variance in accordance with input signal features, but also either isolates transmission noise or decays error propagation within a short time interval if the transmission noise is not isolated.

Figure 1:
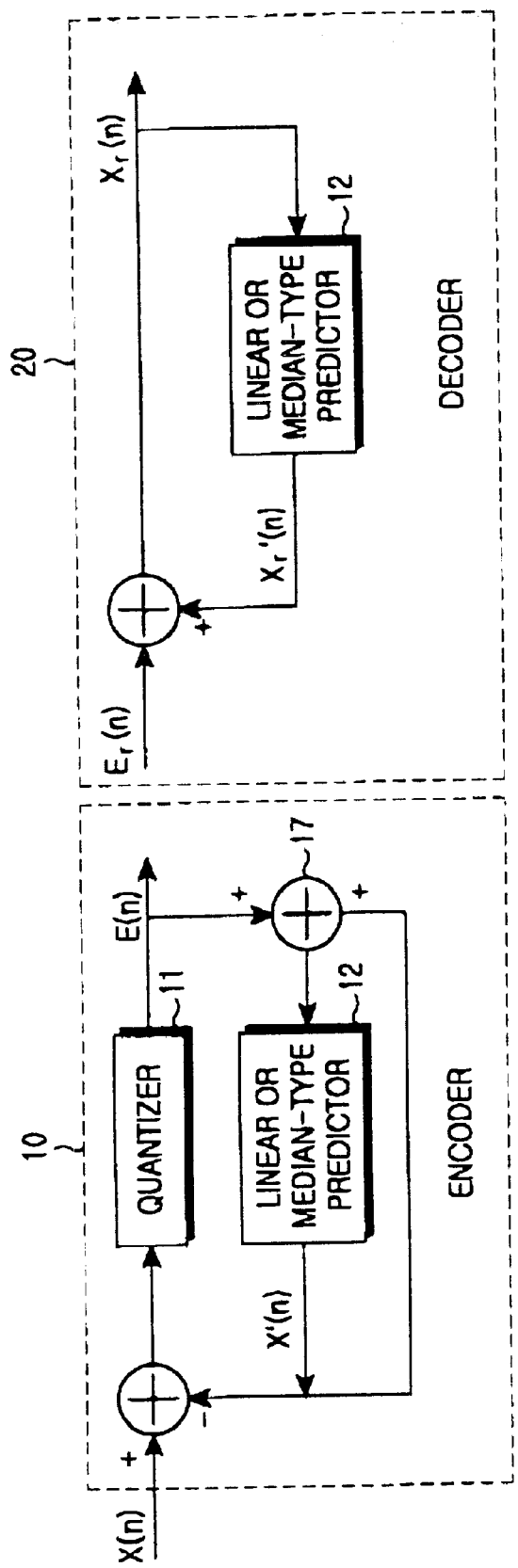
FIG. 1 is a block diagram illustrating a prior art differential pulse code modulation (DPCM) system.
Figure 2:
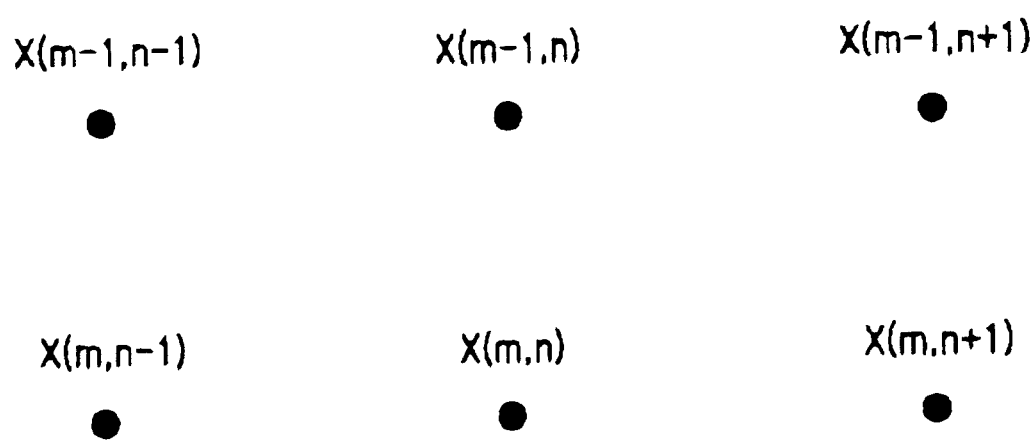
FIG. 2 is a coordinate diagram showing a quadratic dimension mapping input.
Figure 3:
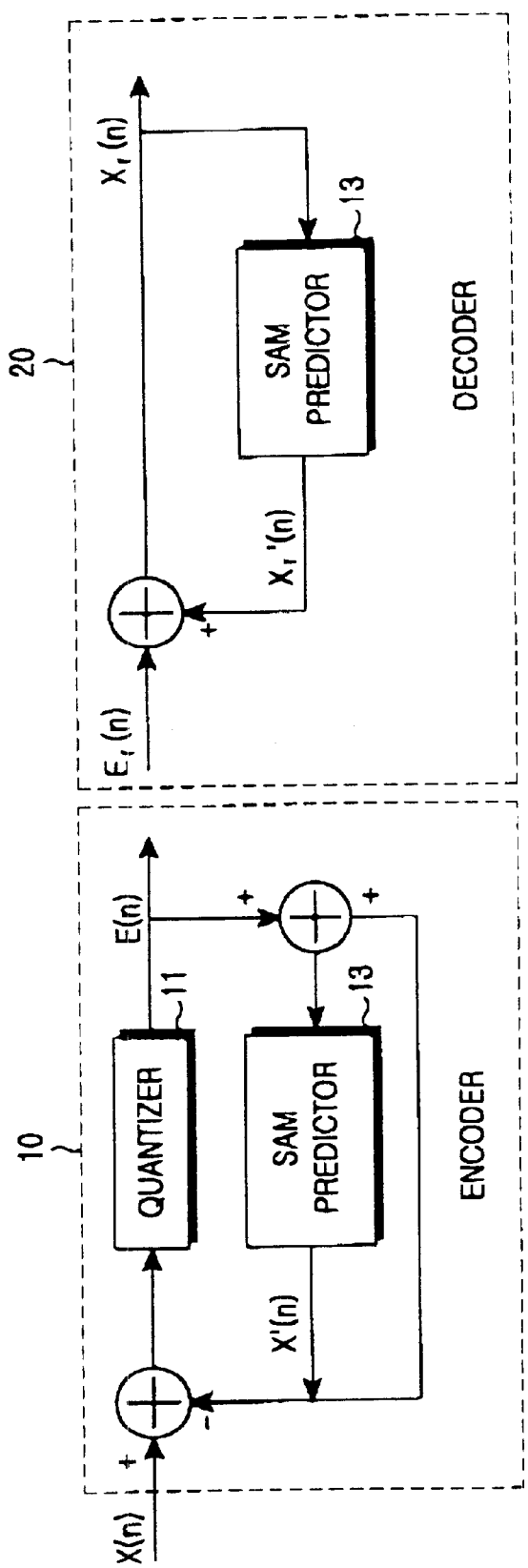
FIG. 3 is a block diagram illustrating a differential pulse code modulation (DPCM) system in accordance with the present invention.

FIG. 3 is a block diagram illustrating a differential pulse code modulation (DPCM) system, 100, in accordance with the present invention. System 100 includes an encoder 110 having a SAM predictor 130 newly designed according to the present invention and a decoder 120 having a SAM predictor 130 of the same structure. Quantizer 11, subtractor 15, and adders 17, 19 perform basically the same functions as those of the prior art FIG. 1.

In FIG. 3, X(n) is an input vector at a position n within the predictor window and E(n) is a prediction error signal generated by the DPCM system. $E_r(n)$ is a prediction error signal received from a transmission channel, and $X_r(n)$ is a reconstructed signal. The SAM predictor output is as follows:

$$SAM(X) = \sum_{i=1}^{P} a_i F_i(X) \qquad (6)$$

where $a_i$ is a coefficient, X is an input vector within the predictor window, $F_i(\ )$ is a characteristic equation of an $i^{th}$ median subfilter, and P is the number of median subfilters. The input vector X comprises a plurality of samples $X_j$ of the predictor input signal within the window. When the SAM predictor has a span of N, the number of input samples $X_j$ is N (i.e., j=1 to N), where $1 \leq P \leq 2^{N-1}$.

When $P = 2^{N-1}$, the SAM predictor comprises all possible median subfilters, and the SAM predictor is referred to as a full-subset averaged median filter. When N=4, the full-subset averaged median filter output $SAM_F(X)$ is as follows:

$$SAM_F(X) = \sum_{i=1}^{4} a_i X_i + a_5 median(X_1, X_2, X_3) + \qquad (7)$$
$$a_6 median(X_1, X_2, X_4) + a_7 median(X_1, X_3, X_4) +$$
$$a_8 median(X_2, X_3, X_4).$$

The full-subset averaged median filter that operates according to equation (7) includes the prior art linear predictor $$\left( \sum_{i=1}^{4} a_i X_i \right).$$

This linear predictor will be referred to hereafter interchangeably as either a first order filter or a first order median subfilter.

Another type of SAM predictor is designated as a robust-SAM filter, which does not include a first order subfilter. When N=4, the robust-SAM filter output is computed as follows:

$$SAM_R(X) = a_1 median(X_1, X_2, X_3) + a_2 median(X_1, X_2, X_4) + a_3 median(X_1, X_3, X_4) + a_4 median(X_2, X_3, X_4). \qquad (8)$$

The foregoing full-subset averaged median predictor which includes the first order filter is most effective for minimizing prediction error variance. The robust-SAM predictor, on the other hand, which excludes the first order filter, is better for isolating transmission error noise. It is possible to design a robust-SAM predictor for removing transmission error noise as well as for minimizing prediction error variance by optimizing the design of the coefficients $a_i$ in accordance with the input signal characteristics.

Ignoring any errors that may be caused by the quantizer, the reconstructed signal condition corresponding to an isolated transmission error is given by equation (9). Supposing that transmission errors occur at a position $n_0$, a prediction error signal value $E(n_0)$ will differ from the $E_r(n_0)$ value. In this case, the reconstructed signal $X_r(n_0)$ differs from $X(n_0)$.

To restrict the error at the $n_0$ position and prevent propagation of the error, equation (9) should be satisfied, which means the transmission error is isolated (i.e., removed).

$$X(n_0+k)=X_r(n_0+k), k=1,\ldots,N \quad (9)$$

By removing a first order median filter, the SAM predictor herein satisfies the above condition, isolating the transmission error.

The SAM predictor may utilize a minimized value for a given coefficient, $a_i$ under a mean square error (MSE) criterion. The prediction error variance, $J(a)$ is computed as follows:

$$J(a) = E\left[\left(X(m,n) - \sum_{i=1}^{P} a_i F_i(X)\right)^2\right] \quad (10)$$

where $a=[a_1, a_2, \ldots, a_P]^T$, and $E[\ ]$ is an expectation operation. Then, the coefficient $a$ for minimizing $J(a)$ is as follows:

$$\psi a_{opt} = \phi \quad (11)$$

where $\psi$ is a P×P correlation matrix equal to $E[F(X)F^T(X)]$, $F^T(X)$ is $[F_1(X), F_2(X), \ldots, F_P(X)]^T$ and $F_i(\ )$ is a characteristic equation of an $i^{th}$ median subfilter. $\phi$ may be replaced with $E[SF(X)]$ and is a form of a cross correlation vector of the $P^{th}$ order, where S is a requisite signal.

A stability condition of the above subset averaged median (SAM) filter is satisfied in accordance with the following: in a system with the configuration of FIG. 3, a signal vector, $X_r(n)$ which is reconstructed within a predictor window can be expressed by the following equation (12), since $X_r(n)$ has an error during transmission:

$$X_r(n) = \sum_{i=1}^{P} a_i F_i(X_r) + E_r(n) \quad (12)$$

Supposing $E_r(n)=0$, $n$ is less than zero, and a maximum value of $E_r(n)$ is $M_e$, the following equation (13) is obtained:

$$|X_r(n)| \le \left|\sum_{i=1}^{P} a_i\right| |F_i(X)| + M_e \quad (13)$$

The following equation (14) is derived from equation (13):

$$\lim_{n \to \infty} |X_r(n)| \le \frac{M_e}{1 - \sum_{i=1}^{P} a_i}. \quad (14)$$

Equation 14 should satisfy the condition $$\left|\sum_{i=1}^{P} a_i\right| < r.$$

A first order differential pulse code modulation encoder using the robust-SAM predictor can be stable under the condition of equation (15):

$$\sum_{i=1}^{P} |a_i| < 1. \quad (15)$$

Consequently, with a robust-SAM predictor designed to minimize a prediction error variance under the condition of equation (15), a stable predictor is obtained. The predictor as designed above can remove a transmission error propagation effect. Also, in order to isolate a transmission error, a robust-SAM predictor sufficient to satisfy the condition of equation (15) should be designed according to the embodiment of the present invention. Therefore, the system designed above can isolate a transmission error or minimize a propagation effect and minimize prediction error variance, thereby providing good signal quality through the two predictors. The prediction error variance $J(a)$ is optimized when $$\sum_{i=1}^{P} |a_i| < 1.$$

It has been found by computer simulation that if noise is not isolated when using a prior art median-type predictor, then an original signal can not be reconstructed. Advantageously, the SAM predictor of the present invention can isolate an error and also recover an original signal during error propagation.

Figure 4:
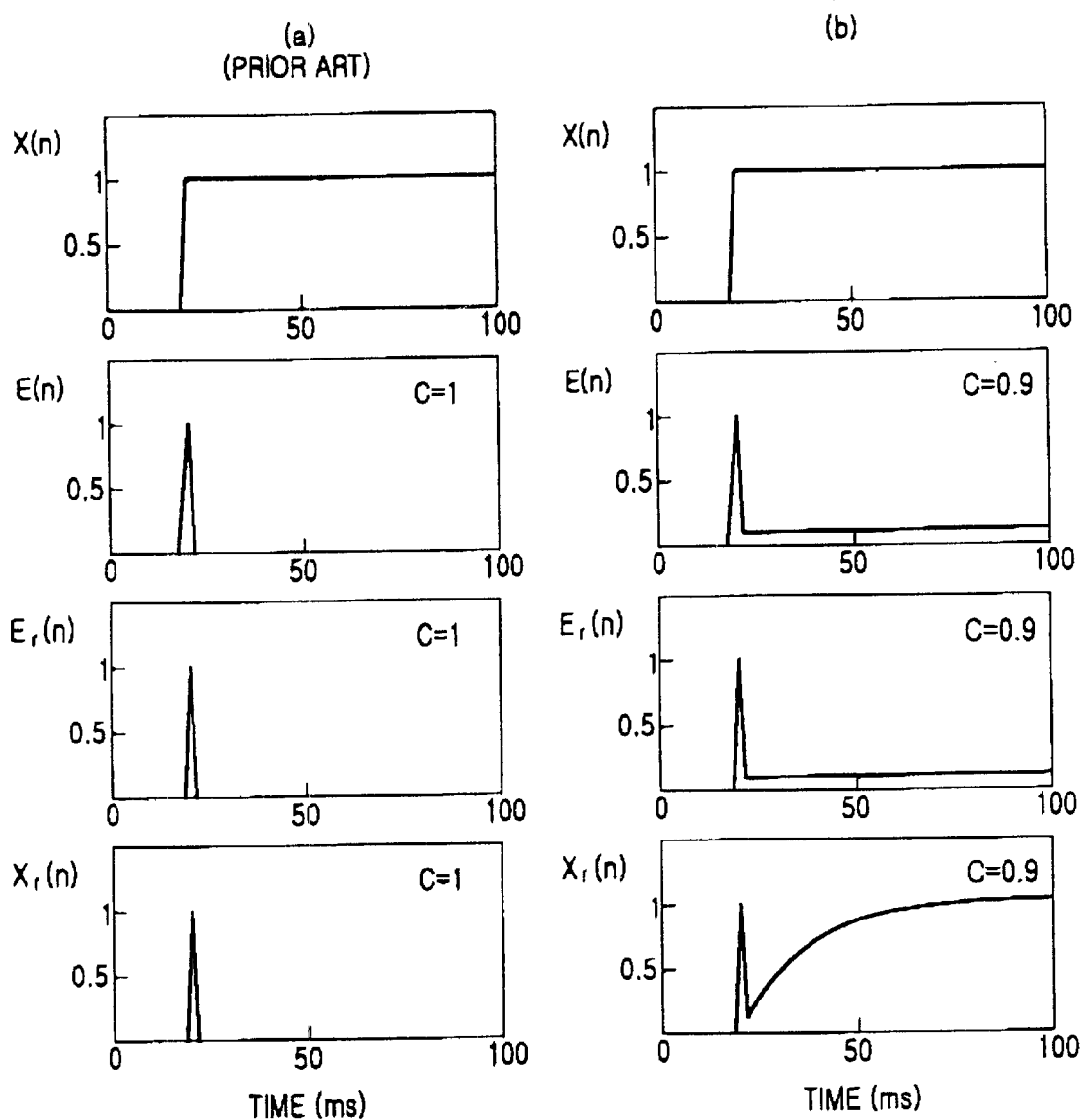
FIG. 4 depicts graphs showing exemplary error propagation effect associated with median predictors, as well as graphs showing signal reconstruction performed by an embodiment of the present invention.

FIG. 4 depicts graphs showing an error propagation effect when median predictors are employed for DPCM, as well as graphs illustrating signal reconstruction performed by an embodiment of the invention. The graphs of the (a) set depict signals of a DPCM using a prior art median predictor. The graphs of the (b) set depict signals of a DPCM using a robust-SAM predictor in accordance with the present invention. The prediction error variance $J(a)$ is shown as variable "c" in FIG. 4. The horizontal axis in each of the figures shows the elapsed time in ms. In the respective graphs of both sets (a) and (b) $X(n)$ is an input step function signal and $E(n)$ is a pulse shaping error signal. $E_r(n)$ is a received prediction error signal when a transmission error is present due to a reduction of the pulse interval, and $X_r(n)$ is a reconstructed signal. From the $X_r(n)$ plots it is seen that with the SAM predictor, the original signal is recovered within a short time interval following the error, whereas no such recovery takes place with the prior art approach. The DPCM system in accordance with the present invention isolates a transmission error to enable recovery of an original signal during error propagation.

Accordingly, the present invention provides a stable system design by applying a subset averaged median (SAM) predictor to a differential pulse code modulation system used for compressing voice or image data. The SAM predictor can be designed to isolate a transmission error and minimize a prediction error variance, thus permitting accurate recovery of an original signal during error propagation.

While the invention is susceptible to various modification and alternative forms, specific embodiments thereof have been shown by way of example in the drawings and detailed description. It should be understood, however, that the present invention is not limited to the particular forms disclosed, but on the contrary, the intention is to cover all modifications, equivalents, and alternatives falling within the spirit and scope of the invention as defined by the appended claims.

What is claimed is:

1. A predictor for a differential pulse code modulation system having an encoder and a decoder, each of which includes said predictor, characterized in that said predictor is a subset averaged median (SAM) predictor which produces an output of the form given by $$\sum_{i=1}^{P} a_i F_i(X),$$

where X is an input vector within a predictor window, P is a number of median subfilters, $a_i$ is a coefficient satisfying $$\sum_{i=1}^{P} |a_i| < 1,$$

and $F_i(\ )$ is a characteristic equation of an $i^{th}$ median subfilter of said P subfilters.

2. The predictor as claimed in claim 1, wherein said input vector X has a span of N, and P satisfies $1 \leq P \leq 2^{N-1}$.

3. The predictor as claimed in claim 2, wherein $P=2^{N-1}$.

4. The predictor as claimed in claim 2, wherein the value of $a_i$ for each median subfilter of the first order is 0.

5. The predictor as claimed in claim 4, wherein the span N=4, said predictor of the type producing an output, $SAM_R(X)$, of the form given by:

$$SAM_R(X) = a_1 \text{median}(X_1, X_2, X_3) + a_2 \text{median}(X_1, X_2, X_4) + a_3 \text{median}(X_1, X_3, X_4) + a_4 \text{median}(X_2, X_3, X_4).$$

6. The predictor as claimed in claim 1, wherein the values of the coefficients $a_i$ are chosen to satisfy $E\lfloor F(X)F^T(X)\rfloor \cdot [a_1, a_2, \ldots a_p]^T = E[SF(X)]$, where $E[\ ]$ is an expectation operator, $F(X)$ is $[F_1(X), F_2(X), \ldots, F_p(X)]^T$ and S is a requisite signal.

7. A method for removing transmission error and minimizing prediction error variance through minimization of error propagation in a subset averaged median (SAM) predictor for a differential pulse code modulation system having an encoder and a decoder, each of which include said SAM predictor, comprising the step of:

producing from said SAM predictor an output of the form given by $$\sum_{i=1}^{P} a_i F_i(X),$$

where X is an input vector within a predictor window, P is the number of median subfilters, $a_i$ is a coefficient, and $F_i(\ )$ is a characteristic equation of an $i^{th}$ median subfilter, wherein said coefficients $a_i$ are chosen to satisfy $$\sum_{i=1}^{P} |a_i| < 1.$$

8. A method for removing transmission error and minimizing prediction error variance through minimization of error propagation in a SAM predictor as claimed in claim 7, wherein the value of $a_i$ for each median subfilter of the first order is chosen to be 0.

9. A method for removing transmission error and minimizing prediction error variance through minimization of error propagation in a SAM predictor as claimed in claim 7, wherein the values of the coefficients $a_i$ are chosen to satisfy $E\lfloor F(X)F^T(X)\rfloor \cdot [a_1, a_2, \ldots a_p]^T = E[SF(X)]$, where $E[\ ]$ is an expectation operator, $F(X)$ is $[F_1(X), F_2(X), \ldots, F_p(X)]^T$ and S is a requisite signal.

10. A method for removing transmission error and minimizing prediction error variance through minimization of error propagation in a SAM predictor as claimed in claim 8, wherein said input vector X has a span of N=4, P satisfies $1 \leq P \leq 2^{N-1}$, and said predictor is of the type producing an output, $SAM_R(X)$, of the form given by:

$$SAM_R(X) = a_1 \text{median}(X_1, X_2, X_3) + a_2 \text{median}(X_1, X_2, X_4) + a_3 \text{median}(X_1, X_3, X_4) + a_4 \text{median}(X_2, X_3, X_4).$$

11. A predictor for a differential pulse code modulation system having an encoder and a decoder, each of which includes said predictor, characterized in that said predictor is a subset averaged median (SAM) predictor which produces an output of the form given by $$\sum_{i=1}^{P} a_i F_i(X),$$

where X is an input vector within a predictor window, P is a number of subfilters, $a_i$ is a coefficient for the $i^{th}$ subfilter of said P subfilters, and $F_i(\ )$ is a characteristic equation of the $i^{th}$ subfilter; wherein, said input vector X has a span of N=4, $P=2^{N-1}$, and said predictor is of the type producing an output, $SAM_F(X)$, of the form given by:

$$SAM_F(X) = \sum_{i=1}^{4} a_i X_i + a_5 \text{median}(X_1, X_2, X_3) + a_6 \text{median}(X_1, X_2, X_4) + a_7 \text{median}(X_1, X_3, X_4) + a_8 \text{median}(X_2, X_3, X_4).$$

* * * * *